(No Model.)
J. D. SHAFFER.
ANIMAL TRAP.
No. 473,967. Patented May 3, 1892.
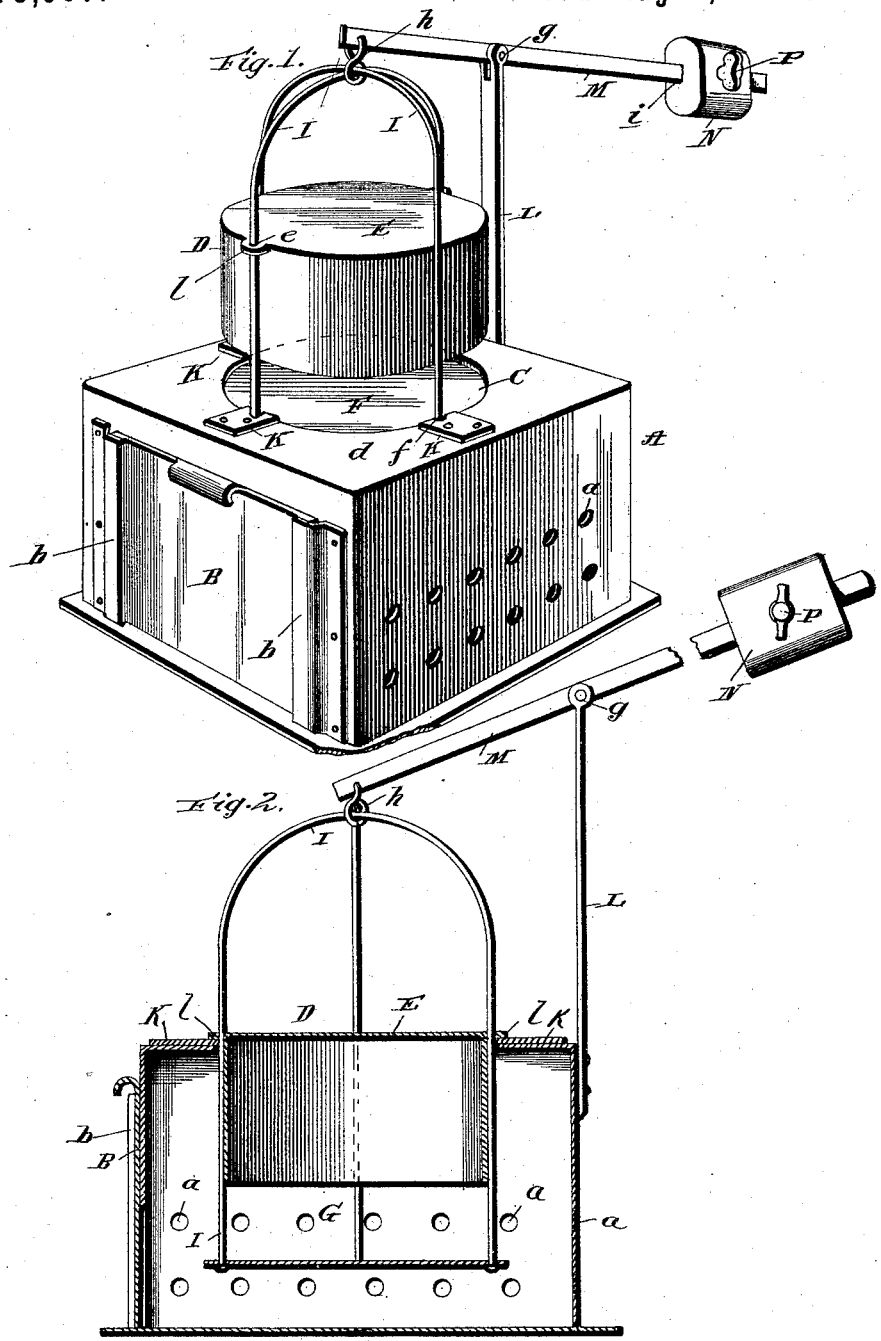
Witnesses:
C. H. Raeder
E. F. Matthews
Inventor
John D. Shaffer
By James J. Sheehy
Attorney

UNITED STATES PATENT OFFICE.

JOHN D. SHAFFER, OF SALT LAKE CITY, UTAH TERRITORY, ASSIGNOR OF ONE-HALF TO WILLIAM A. KINNEY.

ANIMAL-TRAP.

SPECIFICATION forming part of Letters Patent No. 473,967, dated May 3, 1892.

Application filed November 9, 1891. Serial No. 411,352. (No model.)

*To all whom it may concern:*

Be it known that I, JOHN D. SHAFFER, a citizen of the United States, residing at Salt Lake City, in the county of Salt Lake, Utah Territory, have invented certain new and useful Improvements in Animal-Traps; and I do declare the following to be a full, clear, and exact description of the invention, such as will enable others skilled in the art to which it appertains to make and use the same.

This invention relates to an animal-trap, and, while it may also be used for catching birds, yet it is more particularly designed for catching rats and mice.

The object of the invention is to provide a self-set or ever-set trap, which will be automatic in its operation, and after a rat or other animal has been imprisoned the trap will set itself for the next.

A further object of the invention is to provide a cheap and efficient means whereby the trap may be adapted for the smallest mice, as well as the largest rats.

Other objects and advantages will appear from the following description and claims, when taken in connection with the annexed drawings, in which—

Figure 1 is a perspective view of my improved trap, showing the same in a set position; and Fig. 2 is a vertical sectional view of the same, showing the cage in a position which it assumes when a rat enters the same and is carried down to the main cage or prison.

Referring by letter to said drawings, A indicates the main or stationary cage or prison, which may be of any suitable shape, the one here shown being of a rectangular form. This main cage is preferably formed of sheet metal, although it may be formed of other suitable material, and is provided in its side walls with holes $a$ for the admission of light. The cage is also provided in one of its walls with a slide-door B, held in place by means of vertical guide-strips $b$, whereby the rats or mice may be taken from the trap. The top of the cage A is provided with an opening C, which is here shown as circular and which is designed to receive the vertically-movable cage D. This cage B, which is also preferably composed of sheet metal, has a top or hood E, separated from the horizontal floor F by an interspace G. The floor F being thus fixed with respect to the hood E, makes the interspace a means of exit for rats or other animals to be caught. The floor F should be fixed to the top or hood E, so as to move together; and the floor should be of a greater area than the hood or top, so that when raised to its fullest extent it will snugly bear against the under side of the top wall $d$ of the main cage and close the opening C therein. The rods H are secured at their lower ends to the floor near the marginal edge thereof, and after being secured to the top or hood, as shown at $e$, I carry it upwardly and downwardly in a looped manner, so as to form the bails I, and these bails are preferably arranged at right angles with respect to each other, so that they may intersect, as shown. The edges of the opening C in the cage A are provided with notches $f$, which receive the rods H, so as to guide the cage truly vertical; and for the purpose of strengthening these notched parts I prefer to employ plates K, having corresponding notches, and secure them over the notches in the top, as better shown in Fig. 1 of the drawings.

L indicates a standard, which is suitably secured at its lower end to the main cage and has its upper end extending a sufficient distance above the top thereof, where it is preferably forked or bifurcated, as shown at $g$.

M indicates a lever. This lever is pivoted at a suitable point in the upper end of the standard L, and is pivotally connected at one end by a link $h$ or other suitable means to the bails of the vertically-movable cage. The opposite end of this lever carries a weight N, slotted at $i$, so that it may slide on the lever, and also carrying a thumb-screw P, whereby it may be adjustably fixed to the ribs.

While I have described specifically the construction and arrangement of parts precisely as shown, yet I do not wish to be limited to the exact construction and arrangement of devices, as I am aware that many of them might be modified without departing from the spirit of my invention. It is obvious that a single bail might be used instead of two, and it is obvious that any style of door might be employed in the lower or stationary cage.

In setting the trap the weight P can be adjusted on the lever for the character of animals to be trapped—for instance, in setting the trap for mice the weight should be shifted nearer to the standard than when setting it for rats or heavier animals. After the weight has been properly adjusted, bait may be placed on the floor F of the movable cage, where it will be exposed to view from the top of the main cage or frame, and more bait may be placed within the main or stationary cage. As the animal passes through the interspace G on the floor F and overcomes the weight P, the cage will descend, so that the top or hood E will close the opening C in the roof of the main cage, thereby darkening the cage from above, and as the animal sees the light through the openings $a$ in the main cage and steps off of the movable cage, the latter will be drawn up by the action of the weight P, when the trap will immediately set itself. It should be observed that the top or hood E is in outline of a form corresponding to the opening C in the main cage, and moves down in the same. It is preferred that the roof of this cage should have a marginal projection, as shown at $l$, to limit the downward movement of said cage, as better shown in Fig. 2 of the drawings.

In some cases it is obvious that the weight on the pivoted lever might be dispensed with and a spring substituted therefor, although a weight is preferable; and I do not wish to confine myself to any particular shape or formation of either the stationary section of trap or the movable cage.

Having described my invention, what I claim is—

1. A trap comprising a main cage or frame having an opening in its top and a vertically-movable cage suspended in said opening, and having a top or hood separated from its floor to form a passage for the animal, substantially as specified.

2. In an animal-trap, a combination, with a main cage or frame having an opening in its top, of a vertically movable cage suspended in said opening and normally held raised therein by a balance-weight, said movable cage having a top separated from its floor by an interspace, and the floor adapted to be held from rising entirely out of the opening in the main cage, substantially as specified.

3. An animal-trap comprising a main frame or cage having an opening in its top, the vertically-movable cage arranged therein and formed with a hood or top adapted to move in said opening, and a floor, separated from the lower edges of the side walls of the top and of a greater circular area, so that it may be prevented from entirely leaving the opening in the main cage, a standard secured to the main cage, and a lever pivoted on the standard and connected at one end with a movable cage and its opposite end carrying an adjustable weight, substantially as specified.

4. The main cage or frame having perforated side walls and a door in one of the walls, said cage also having an opening in its top and notches in said opening, in combination with a vertically-movable cage comprising the floor F, the top or hood E, separated from the floor, so as to form a passage, the rods connecting the floor to the hood and looped above the same, the standards secured to the main cage, the lever pivoted to the standard and connected at one end to the movable cage, and a weight on the opposite end of said lever carrying a set-screw, substantially as specified.

In testimony whereof I affix my signature in presence of two witnesses.

JOHN D. SHAFFER.

Witnesses:
E. W. TAYLOR,
PETER C. BROWN.